United States Patent
Soejima et al.

(10) Patent No.: US 9,876,939 B2
(45) Date of Patent: Jan. 23, 2018

(54) IMAGE PROCESSING APPARATUS, IMAGE PROCESSING SYSTEM, AND RECORDING MEDIUM

(71) Applicant: KONICA MINOLTA, INC., Chiyoda-ku, Tokyo (JP)

(72) Inventors: Hideaki Soejima, Amagasaki (JP); Junichi Hase, Osaka (JP); Hidetaka Iwai, Itami (JP); Nobuhiro Mishima, Osaka (JP); Yosuke Taniguchi, Osaka (JP); Toshikazu Kawaguchi, Kobe (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 4 days.

(21) Appl. No.: 15/078,266

(22) Filed: Mar. 23, 2016

(65) Prior Publication Data

US 2016/0295074 A1 Oct. 6, 2016

(30) Foreign Application Priority Data

Mar. 31, 2015 (JP) ................................. 2015-071051

(51) Int. Cl.
*G06K 15/00* (2006.01)
*H04N 1/44* (2006.01)
*H04N 1/00* (2006.01)

(52) U.S. Cl.
CPC ....... *H04N 1/4433* (2013.01); *H04N 1/00209* (2013.01); *H04N 1/00307* (2013.01); *H04N 2201/0094* (2013.01); *H04N 2201/3202* (2013.01)

(58) Field of Classification Search
CPC ............. H04N 1/4433; H04N 1/00209; H04N 1/00307; H04N 2201/0094; H04N 2201/3202
USPC ......................................................... 358/1.14
See application file for complete search history.

(56) References Cited

U.S. PATENT DOCUMENTS

| 8,767,225 B2* | 7/2014 | Sasakuma ............. G06F 3/1204 358/1.1 |
| 2015/0116756 A1* | 4/2015 | Mori ...................... G06F 3/1204 358/1.14 |

FOREIGN PATENT DOCUMENTS

JP 2011-071588 A 4/2011

\* cited by examiner

*Primary Examiner* — Neil R McLean
(74) *Attorney, Agent, or Firm* — Buchanan Ingersoll & Rooney PC

(57) ABSTRACT

An image processing apparatus includes: an information obtaining portion that obtains association information indicating an association between a first and second portable terminal apparatus from an association information storage, the first portable terminal apparatus having a proper permission to use a function of the image processing apparatus from the first portable terminal apparatus, the second portable terminal apparatus having a temporary permission to use the function from the second portable terminal apparatus in place of the first portable terminal apparatus; a data storage that stores data caused by a process between the image processing apparatus and the second portable terminal apparatus; an online terminal detector that detects the first portable terminal apparatus as being online; and a data provider that provides the data to the first portable terminal apparatus from the data storage when the online terminal detector detects the first portable terminal apparatus as being online.

17 Claims, 12 Drawing Sheets

| User Name | Registered/ Unregistered | Terminal Information of the Proper Terminal | Address of the Proper Terminal | Scope of the Proper Use Permission | | Temporary Terminal | Address of the Temporary Terminal |
|---|---|---|---|---|---|---|---|
| | | | | Allowed MFPs | Allowed Networks | | |
| User A | Registered | 1111 | abc... | All in-house MFPs | Free | 9876 | jkl... |
| User B | Unregistered | ---- | ---- | ---- | ---- | ---- | ---- |
| User C | Registered | 1122 | def... | All in-house MFPs | Free | 7354 | mno... |
| .. | .. | | | | | | |
| User D | Registered | 1188 | ghi... | All in-house MFPs | Free | Not present | Not present |
| .. | .. | | | | | | |

FIG.5

| No. | Sender | Process | Document Title | Destination | Date and Time | Result |
|---|---|---|---|---|---|---|
| 621 | MFP11 | Scan | A001 | 9876 | 2015.02.13  12:53:40 | OK |
| 622 | ---- | ---- | ---- | ---- | ---- | ---- |

FIG.8

| No. | Process | Document Title | MFP | Sender | Print Settings | Date and Time | Result |
|---|---|---|---|---|---|---|---|
| 701 | Print | A002 | MFP1 | 9876 | A4<br>Full-color<br>Both-sided | 2015.02.13<br>12:53:40 | OK |
| 702 | ---- | ---- | ---- | ---- | ---- | ---- | ---- |

FIG.12

IMAGE PROCESSING APPARATUS, IMAGE PROCESSING SYSTEM, AND RECORDING MEDIUM

This application claims priority under 35 U.S.C. §119 to Japanese Patent Application No. 2015-071051 filed on Mar. 31, 2015, the entire disclosure of which is incorporated herein by reference in its entirety.

BACKGROUND OF THE INVENTION

Field of the Invention

The present invention relates to: an image processing apparatus such as a multifunctional digital image forming apparatus (i.e., a multi-function peripheral abbreviated as MFP) having multiple functions, e.g., copier function, printer function, facsimile function, and scanner function; an image processing system provided with this image processing apparatus and a portable terminal apparatus; and a recording medium.

Description of the Related Art

The following description sets forth the inventor's knowledge of related art and problems therein and should not be construed as an admission of knowledge in the prior art.

At offices or other work locations, users can use functions of such an image processing apparatus as described above from their portable terminal apparatuses, e.g., smartphones and tablet computers. In the circumstances, their portable terminal apparatuses are normally registered for security purposes. So, nobody can use functions of this image processing apparatus from an unregistered portable terminal apparatus.

However, it often happens that they accidentally have a trouble on their registered portable terminal apparatuses or find themselves without their registered portable terminal apparatuses. When it happens at offices, they will be unable to use functions of the image processing apparatus from their portable terminal apparatuses and thus suffer from slow down at work. In other cases users sometimes need to work with a portable terminal apparatus having a larger display than those of their registered portable terminal apparatuses.

To meet this need, suggested is an image processing apparatus that gives a temporary permission to use functions of the image processing apparatus from an unregistered portable terminal apparatus (also to be referred to as "temporary terminal") in place of a registered portable terminal apparatus (also to be referred to as "proper terminal") having a proper permission to use them.

Furthermore, Japanese Laid-Open Patent Publication No. 2011-071588 suggests a technique that gives a temporary permission to use an image forming apparatus having a user authentication function. More specifically, a regular authentication database stores regular authentication data that is identifiers registered by an administrator, and a temporary authentication database stores temporary authentication data that is user identifiers registered by users who will possibly need to use the image processing apparatus temporarily. If an authentication data registration judgment portion judges that both of the regular authentication database and the temporary authentication database store no identifier that is identical to a user identifier entered and received from a terminal apparatus, an identifier that is identical to the user identifier is stored on the temporary authentication database as temporary authentication data. If either of the databases stores such an identifier, the user who entered this user identifier is successfully authorized.

However, there is an unsolved problem with the image processing apparatus that gives a temporary permission to use functions of the image processing apparatus from the temporary terminal in place of the proper terminal, as described below.

When the user accidentally finds himself/herself without the proper terminal, for example, he/she has to take an immediate step by transferring scan data from the image processing apparatus to the temporary terminal, not to the proper terminal. Then he/she further has to be bothered by transferring the scan data to the proper terminal from the temporary terminal in order to have it in the proper terminal as originally intended.

Meanwhile, for purposes of consolidation of information, the user may need to keep in the proper terminal a complete log record about a process whichever between the image processing apparatus and the proper terminal or between the image processing apparatus and the temporary terminal. Even if that is the case, it is not possible actually because, when the user uses functions of the image processing apparatus from the temporary terminal temporarily, the temporary terminal creates a log record to keep it in the temporary terminal itself, and the proper terminal does not take it therefrom. Thus log information is dispersed, making log information management complicated.

Briefly, the unsolved problem is that the proper terminal is not allowed to keep in itself the data that the proper terminal should have normally kept in itself if the proper terminal were used, also after the temporary terminal is used temporarily in place of the proper terminal.

Since it is not a technique for giving a temporary permission to use functions of the image processing apparatus from the temporary terminal in place of the proper terminal, the technique described in Japanese Laid-Open Patent Publication No. 2011-071588 does not bring a solution to the above-described problem.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an image processing apparatus including:

an information obtaining portion that obtains association information indicating an association between a first portable terminal apparatus and a second portable terminal apparatus from an association information storage that stores the association information, the first portable terminal apparatus having a proper use permission to use a function of the image processing apparatus from the first portable terminal apparatus, the second portable terminal apparatus having a temporary use permission to use the function of the image processing apparatus from the second portable terminal apparatus in place of the first portable terminal apparatus, the association information storage being installed inside or outside the image processing apparatus; and a data storage that stores data caused by a process between the image processing apparatus and the second portable terminal apparatus, the data to be transferred and stored to the first portable terminal apparatus, wherein the data should have normally being stored in the first portable terminal apparatus if it were caused by a process between the image processing apparatus and the first portable terminal apparatus, the image processing apparatus further including:

an online terminal detector that detects the first portable terminal apparatus online; and a data provider that provides the data to the first portable terminal apparatus when the online terminal detector detects the first portable terminal apparatus online, the data being stored on the data storage, the data being or not being fit to a recordable format on the first portable terminal apparatus, the first portable terminal apparatus being associated with the second portable terminal apparatus according to the association information obtained by the information obtaining portion.

A second aspect of the present invention relates to a non-transitory computer-readable recording medium storing a program for making a computer of an image processing apparatus execute:

obtaining association information indicating an association between a first portable terminal apparatus and a second portable terminal apparatus from an association information storage that stores the association information, the first portable terminal apparatus having a proper use permission to use a function of the image processing apparatus from the first portable terminal apparatus, the second portable terminal apparatus having a temporary use permission to use the function of the image processing apparatus from the second portable terminal apparatus in place of the first portable terminal apparatus, the association information storage being installed inside or outside the image processing apparatus; and storing on a data storage data caused by a process between the image processing apparatus and the second portable terminal apparatus, the data to be transferred and stored to the first portable terminal apparatus, wherein the data should have normally being stored in the first portable terminal apparatus if it were caused by a process between the image processing apparatus and the first portable terminal apparatus, the program for making the computer further execute:

detecting the first portable terminal apparatus online; and providing the data to the first portable terminal apparatus when the first portable terminal apparatus is detected online, the data being stored on the data storage, the data being or not being fit to a recordable format on the first portable terminal apparatus, the first portable terminal apparatus being associated with the second portable terminal apparatus according to the association information obtained from the association information storage.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 5 is a table containing management information, which is registered on the management server;

FIG. 8 illustrates an example of a table of log information;

FIG. 12 illustrates an example of a table of print log information;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described with reference to the accompanying drawings.

Figure 1:
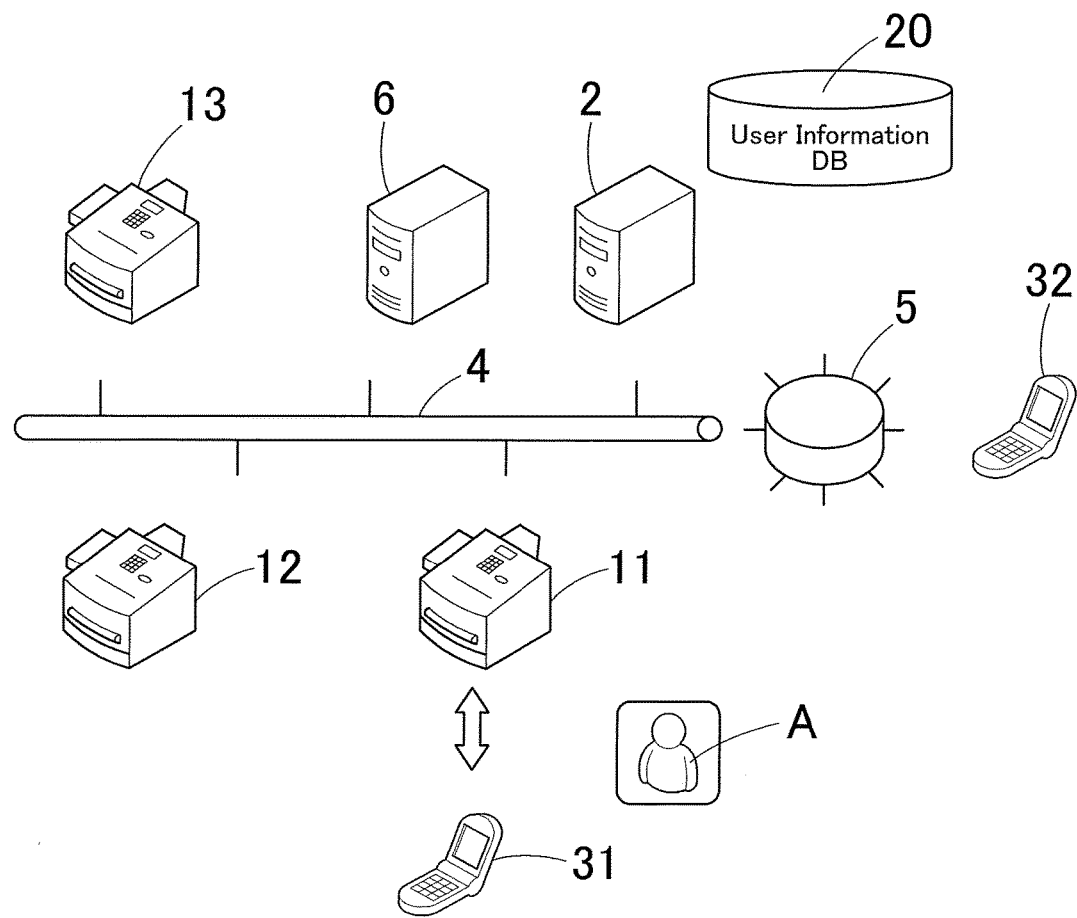
FIG. 1 illustrates a configuration of an image processing system provided with an image processing apparatus according to one embodiment of the present invention.

FIG. 1 illustrates a configuration of an image processing system provided with an image processing apparatus according to one embodiment of the present invention. This image processing system is provided with a plurality of image processing apparatuses 11 to 13 (they are three in this embodiment), one terminal management server 2, a first portable terminal apparatus 31, a second portable terminal apparatus 32, and a log management server 6, all of which are connected to a corporate network 4 such as a local area network (LAN) and the Internet 5. The first and second portable terminal apparatuses 31 and 32 and the image processing apparatuses 11 to 13 are capable of communicating to each other in a wireless manner.

In this embodiment, a MFP, having various functions such as copier function, printer function, scanner function, and facsimile function as described above, is employed as the image processing apparatuses 11 to 13. Hereinafter, the image processing apparatuses will also be referred to as "MFPs". The portable terminal apparatuses will also be referred to as "portable terminals" or, more simply, "terminals". The first portable terminal apparatus 31 will also be referred to as "proper terminal 31", and the second portable terminal apparatus 32 will also be referred to as "temporary terminal 32".

The MFPs 11 to 13 are apparatuses that form, on a sheet of paper, a document image obtained by scanning and a copy image reproduced from print data received from an information processing apparatus not shown in the figure or from the portable terminals 31 and 32. The MFPs 11 to 13 are capable of transferring a document image obtained by scanning, to another MFP through the corporate network 4. The MFPs 11 to 13 are also capable of transferring such a document image to a MFP and an information processing apparatus on a different network, through the Internet 5. The MFPs 11 to 13 are also capable of storing such a document image, print data received from an information processing apparatus, the proper terminal 31, or the temporary terminal 32, and other data, on a fixed storage device.

Figure 2:
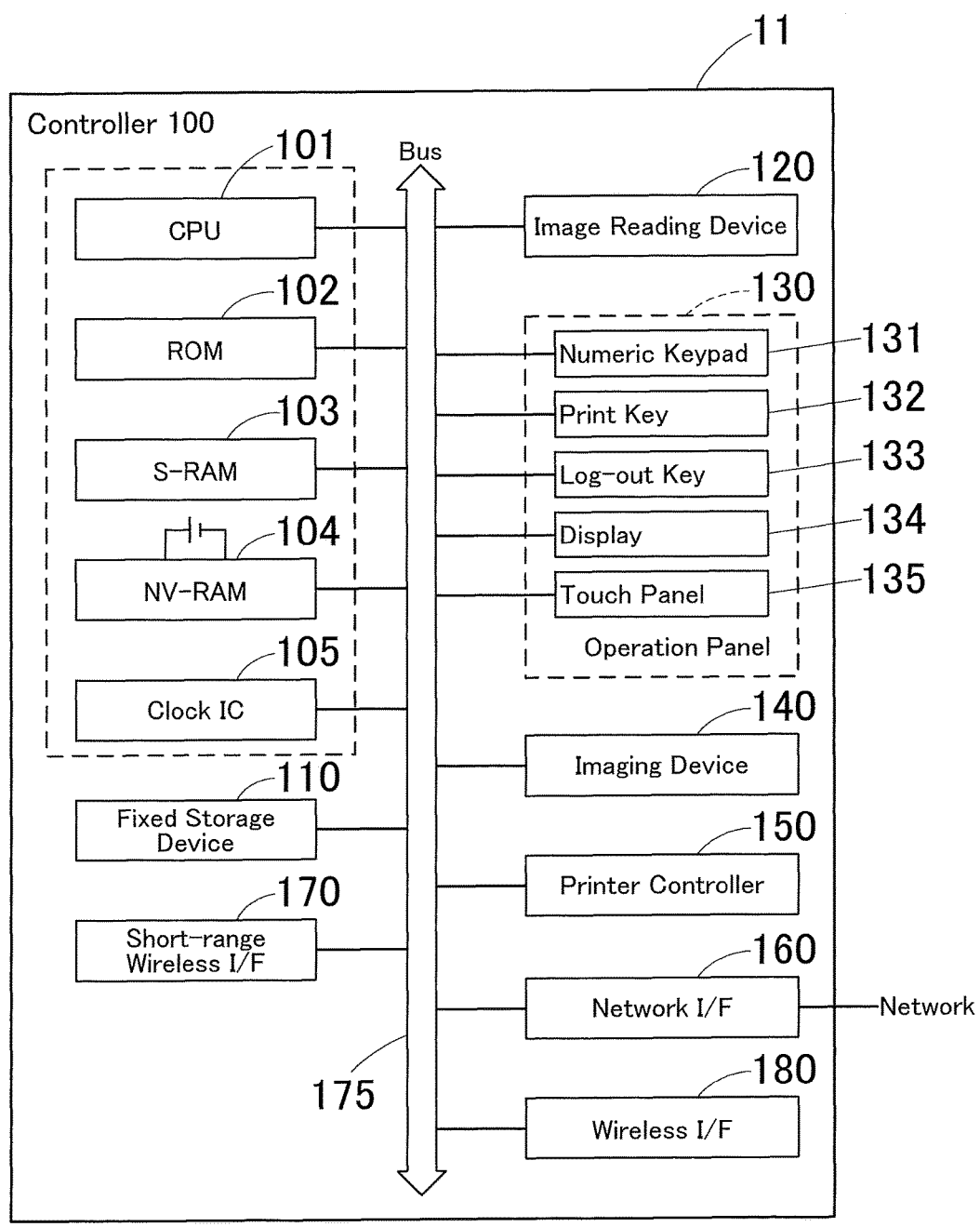
FIG. 2 is a block diagram illustrating an electrical configuration of the image processing apparatus.

FIG. 2 is a block diagram illustrating an electrical configuration of the MFPs 11 to 13. The MFP 11 hereinafter will be described as a representative of the MFPs 11 to 13 since the MFPs 11 to 13 have a common electrical configuration.

As illustrated in FIG. 2, the MFP 11 is provided with a controller 100, a fixed storage device 110, an image reading device 120, an operation panel 130, an imaging device 140, a printer controller 150, a network interface (network I/F) 160, a short-range wireless interface (short-range wireless I/F) 170, and a wireless interface (wireless I/F) 180, all of which are connected to each other through the intermediation of a system bus 175.

The controller 100 is essentially provided with a CPU 101, a ROM 102, a static random access memory (S-RAM) 103, a NV-RAM 104, and a clock IC 105.

The CPU 101 controls the MFP 11 in a unified and systematic manner by executing programs stored on a recording medium such as the ROM 102. In this embodiment, the CPU 101 transmits and receives data to and from the proper terminal 31 and the temporary terminal 32 and transfers an application to the same. The CPU 101 further revises a log record. These operations will be later described in details.

The ROM 102 stores programs for the CPU 101 to execute and other data.

The S-RAM 103 serves as a work area for the CPU 101 to execute the programs with, which temporarily stores the programs, data serving to execute the programs, and other data.

The NV-RAM 104 is a battery backed-up non-volatile memory, which stores various settings and other data serving for image forming.

The clock IC 105 serves as an internal timer, which essentially measures a period of time for processing.

The fixed storage device 110 consists of a hard disk drive, for example, which stores programs and other data of various types.

The image reading device 120, which is essentially provided with a scanner, obtains a document image by scanning a document put on a platen and converts the obtained document image into image data format.

The operation panel 130 allows users to give a request for a process such as a job to the MFP 11 and configure various settings of the MFP 11. The operation panel 130 is essentially provided with a numeric keypad 131, a print key 132, a log-out key 133, a display 134, and a touch panel 135.

The numeric keypad 131 allows users to configure various settings; the print key 132 allows them to give a request for a print. The log-out key 133 is pressed when they finish using the MFP 11.

The operation panel 134 consists of a liquid-crystal screen, for example, which displays messages, various operation screens, and other information.

The touch panel 135 covers the surface of the screen of the display 134 to detect user touch events.

The imaging device 140 forms a reproduced copy image on a sheet of paper.

The printer controller 150 reproduces a copy image from print data received by the network interface 160.

The network interface (network I/F) 160 serves as a communicator that transmits and receives data to and from external apparatuses such as the proper terminal 31, the temporary terminal 32, the terminal management server 2, and the log management server 6.

The short-range wireless interface 170 serves for communicating essentially with the proper terminal 31 and the temporary terminal 32 by short-range wireless technology. The wireless interface (wireless I/F) 180 serves for communicating with the corporate network 4, the proper terminal 31, and the temporary terminal 32 in a wireless manner. The short-range wireless communication system may be, for example, BLUETOOTH or an infrared communication system based on the INFRARED DATA ASSOCIATION (IRDA) standard.

The terminal management server 2 consists of a personal computer, which registers and manages information essentially about users, the proper terminal 31, and the temporary terminal 32, on a user information database 20.

The log management server 6 is also comprised of a personal computer, which stores and manages log records about processes between the MFP 11 and the proper terminal 31 and between the MFP 11 and the temporary terminal 32, and the log records are received from the MFP 11.

Figure 3:
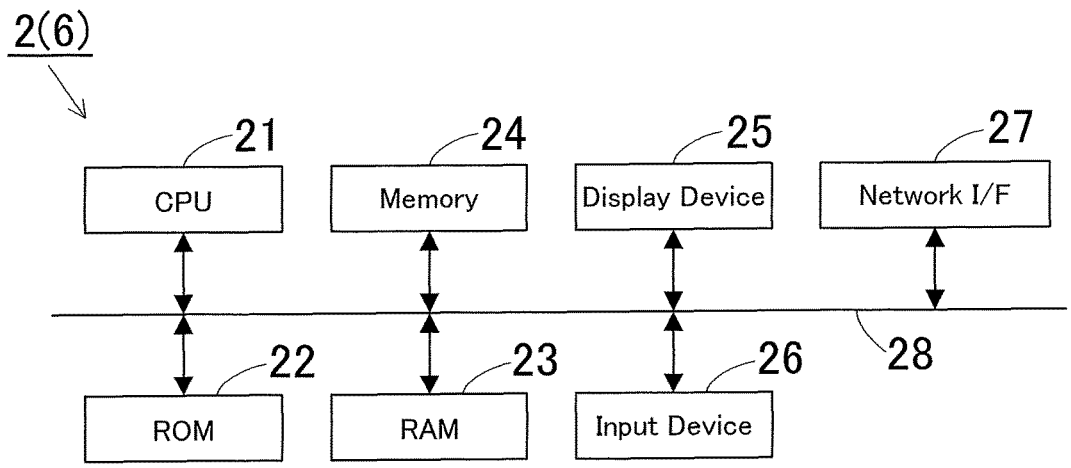
FIG. 3 is a block diagram illustrating a system configuration of a management server.

FIG. 3 is a block diagram illustrating a system configuration of the terminal management server 2. As illustrated in FIG. 3, the terminal management server 2 is essentially provided with a CPU 21, a ROM 22, a RAM 23, a memory 24, a display device 25, an input device 26, and a network interface (network I/F) 27, all of which are connected to each other by the intermediary of a system bus 28.

The CPU 21 controls the terminal management server 2 in a unified and systematic manner by executing programs stored on the ROM 22. The ROM 22 is a recording medium that stores operation programs for the CPU 21 to execute and other data. The RAM 23 is a recording medium that provides a work area for the CPU 21 to perform processing with, in accordance with the operation programs.

The memory 24 consists of a recording medium such as a hard disk drive, which stores various management information and other data that are registered thereon.

The display device 25 consists of a CRT or liquid crystal display device, which displays various messages, entry screens, selection screens, and other information for users.

The input device 26 serves for user input, being essentially provided with a keyboard and a mouse.

The network interface 27 serves as a communicator that transmits and receives data to and from an external apparatus such as the MFPs 11 to 13 through the corporate network 4.

Only a short description of the configuration of the log management server 6 will be provided below because it is common with the terminal management server 2. The log management server 6 is provided with the memory 24, and it is the memory 24 that stores log records about processes both between the MFP 11 and the proper terminal 31 and between the MFP 11 and the temporary terminal 32.

The proper terminal 31 and the temporary terminal 32 each consists of a smartphone or a tablet computer, for example. The proper terminal 31 is a portable terminal apparatus already registered on the terminal management server 2 as a proper portable terminal apparatus owned by a certain user (User A, for example). So, User A can use functions of MFPs from the proper terminal 31 within a predetermined scope of the proper use permission. The temporary terminal 32 is a portable terminal apparatus to be used by User A in place of the proper terminal 31 under temporary use permission.

Figure 4:
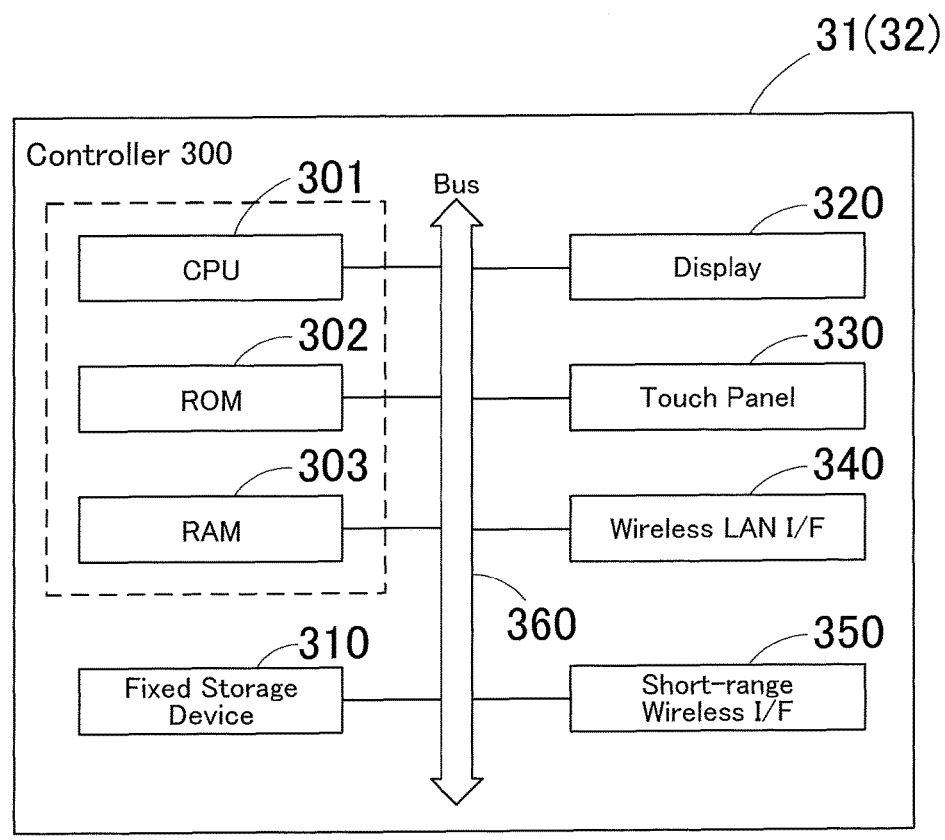
FIG. 4 is a block diagram illustrating an electrical configuration of a portable terminal apparatus.

FIG. 4 is a block diagram illustrating an electrical configuration of the proper terminal 31 and the temporary terminal 32. The proper terminal 31 and the temporary terminal 32 have a common electrical configuration.

The proper terminal 31 and the temporary terminal 32 are each essentially provided with a controller 300, a fixed storage device 310, a display 320, a touch panel 330, a wireless LAN interface (wireless LAN I/F) 340, and a short-range wireless interface (short-range wireless I/F) 350, all of which are connected to each other by the intermediary of a system bus 360.

The controller 300 is essentially provided with a CPU 301, a ROM 302, and a RAM 303. The CPU 301 controls the proper terminal 31 and the temporary terminal 32 in a unified and systematic manner by executing programs stored on a recording medium such as the ROM 302. In this embodiment, the CPU 301 transmits and receives data to and from the MFPs 11 to 13, downloads an application from the MFPs 11 to 13, and transmits a request for use of functions to the MFPs 11 to 13. The temporary terminal 32 deletes data received from the MFPs 11 to 13 in accordance with a command from the MFPs 11 to 13. This operation will be later described in details.

The ROM 302 stores programs for the CPU 301 to execute and other data.

The RAM 303 serves as a work area for the CPU 301 to execute the programs with, which temporarily stores the programs, data serving to execute the programs, and other data.

The fixed storage device 310 consists of a hard disk drive, for example, which stores applications and other data of various types.

The display 320 displays operation screens, various messages, and other information. The touch panel 330 covers the surface of the screen of the display 320 to detect user touch events.

The wireless LAN interface 340 serves for communicating with the corporate network 4 and the Internet 5 in a wireless manner. The short-range wireless interface 350 serves for communicating essentially with the MFPs 11 to 13 by short-range wireless technology.

FIG. 5 is a table containing management information, which is registered on the terminal management server 2. In this embodiment, the table of management information is composed of the following columns: user name, registered/unregistered, terminal information of the proper terminal, address of the proper terminal, scope of the proper use permission, terminal information of the temporary terminal, and address of the temporary terminal. This management information is managed about every user or about every portable terminal.

The "registered/unregistered" column contains information indicating whether or not the proper terminal 31, from which the user normally uses functions of the MFPs 11 to 13, is registered.

The "terminal information of the proper terminal" column contains identification information (identification number, in this example) of the proper terminal 31 that is registered.

The "scope of the proper use permission" column contains a scope of a proper use permission predetermined for the proper terminal 31, which defines allowed MFPs and allowed networks. For example, User A owns the proper terminal 31 identified by identification number 1111. Use of MFPs is limited such that User A can use all in-house MFPs and all networks from the proper terminal 31.

The "address of the proper terminal" column contains an IP-based network address, an e-mail address, and other contact addresses of the proper terminal 31.

The "terminal information of the temporary terminal" column contains identification information (identification number, in this example) of the temporary terminal 32 having a temporary use permission. As long as this column contains information as "not present", there is no temporary terminal 32 having a temporary use permission. When the temporary use permission is withdrawn from the temporary terminal 32, the information in this column is then changed to "not present". In other words, the "terminal information of the temporary terminal presently used" column contains information indicating the association between the proper terminal 31 and the temporary terminal 32.

The "address of the temporary terminal" column contains an IP-based network address, an e-mail address, and other contact addresses of the temporary terminal 32.

Hereinafter, examples of the operation performed by the MFP 11 in the image processing system of FIG. 1 will be described with reference to FIGS. 6 and 7. In these examples, the MFP 11 starts this operation when it receives a user instruction to scan a document with the image reading device 120 and transmit scanned image data to the proper terminal 31.

When any of the MFPs 11 to 13 (the MFP 11, in this example) gives a temporary use permission to the temporary terminal 32, the MFP 11 then installs a management application to the temporary terminal 32. This management application serves for managing data in the temporary terminal 32, sets a flag in the background to new data caused by a process between the MFP 11 and the temporary terminal 32, and restoring the temporary terminal 32 to the conditions before temporary use by deleting the new data when temporary use is finished.

While the temporary terminal 32 has a temporary use permission, the user puts a document on the image reading device 120, sets the destination to the proper terminal 31, and gives an instruction for a scan-to-folder process. With reference to the management information stored on the terminal management server 2, the MFP 11 confirms that the temporary terminal 32 has a temporary use permission and the temporary terminal 32 is associated with the proper terminal 31 that is the destination. The MFP 11 then obtains an identification number and an address of the temporary terminal 32.

Figure 6:
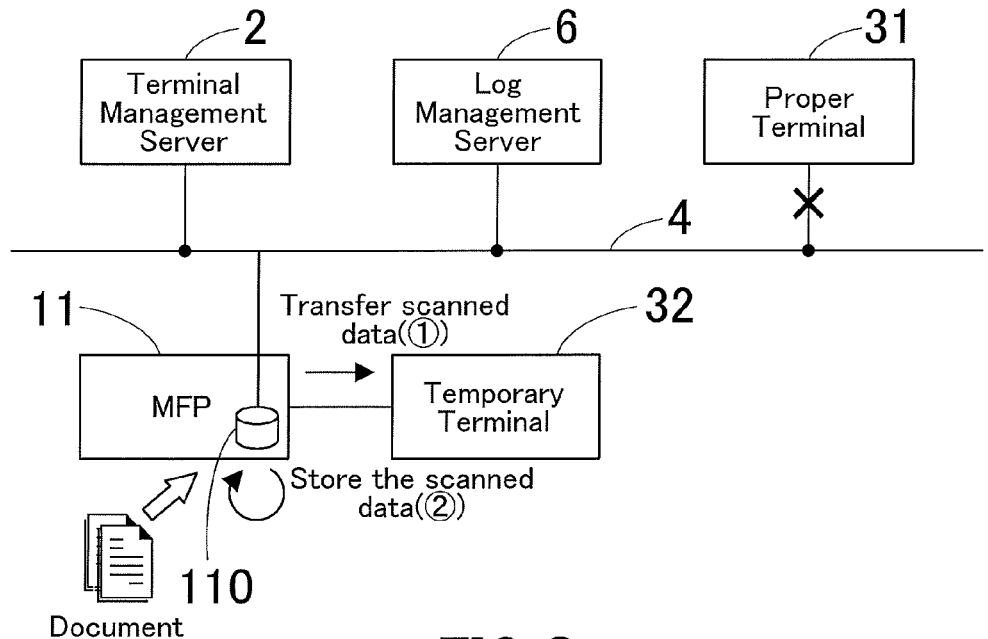
FIG. 6 is an explanatory view illustrating an example of the operation performed by the image processing apparatus in the image processing system of FIG. 1.

The MFP 11 changes the destination from the proper terminal 31 to the temporary terminal 32, scans the document with the image reading device 120, and transfers scanned image data (scanned data) to the temporary terminal 32 that is now the destination (refer to the circled number 1 in FIG. 6).

The MFP 11 also stores the scanned data on the fixed storage device 110, along with information indicating the association between the proper terminal 31 and the temporary terminal 32 (refer to the circled number 2 in FIG. 6).

After transferring the scanned data, the MFP 11 stores a log record such as that in the example of FIG. 8 to the log management server 6. The table of log information is essentially composed of the following columns: sender, process, document title, destination, date and time, and result. The "destination" column contains identification information of the temporary terminal 32 to which the scanned data was transferred. The "sender" column contains information of the MFP 11 that executed the scan-to-folder process.

After transferring the scanned data to the temporary terminal 32, the MFP 11 detects the proper terminal 31 online through the intermediary of the terminal management server 2. The MFP 11 may not be able to detect the proper terminal 31 online because of losing communication with the proper terminal 31. In this case, the MFP 11 keeps sending an inquiry to the terminal management server 2 until regaining communication with the proper terminal 31.

Figure 7:
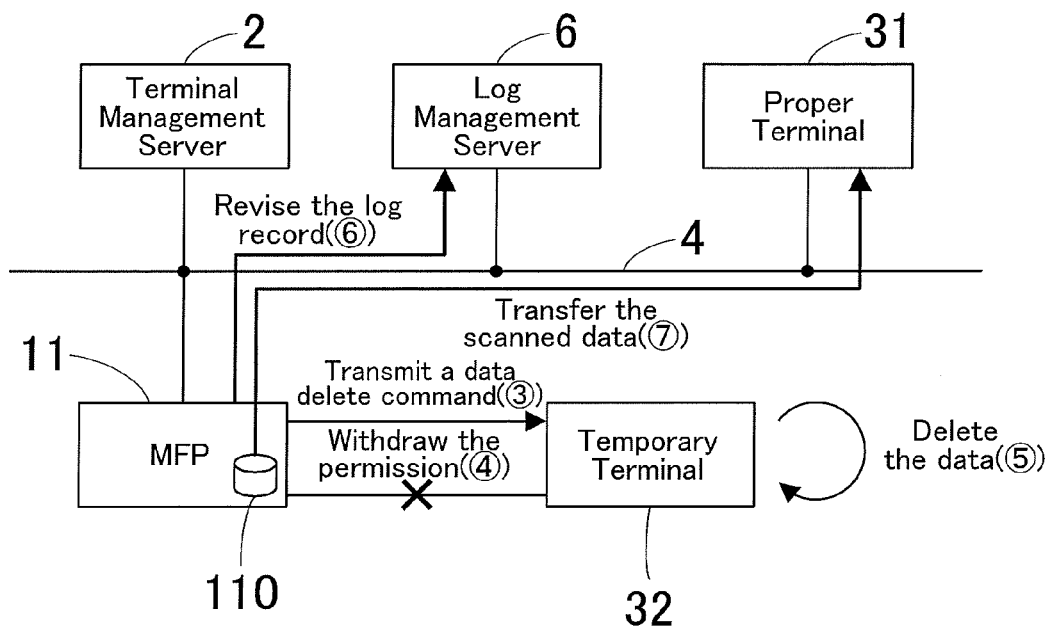
FIG. 7 is an explanatory view illustrating another example of the operation performed by the image processing apparatus in the image processing system of FIG. 1.

When the MFP 11 regains communication with the proper terminal 31 and detects the proper terminal 31 online, the MFP 11 then transmits a data delete command to the temporary terminal 32 (refer to the circled number 3 in FIG. 7) and withdraws the permission from the temporary terminal 32 (refer to the circled number 4 in FIG. 7). In accordance with the data delete command from the MFP 11, the temporary terminal 32 activates the management application installed thereon and deletes the scanned data (refer to the circled number 5 in FIG. 7).

Subsequently, the MFP 11 requests the log management server 6 to rewrite the destination in the log record, from the temporary terminal 32 to the proper terminal 31 that is associated with the temporary terminal 32 (refer to the circled number 6 in FIG. 7). As requested, the log management server 6 rewrites the identification information in the "destination" column in the log record, from that of the temporary terminal 32 to that of the proper terminal 31.

Furthermore, the MFP 11 transfers the scanned data to the proper terminal 31 from the fixed storage device 110 (refer to the circled number 7 in FIG. 7). Receiving this scanned data, the proper terminal 31 stores it on a recording medium such as the fixed storage device 310.

Figure 9:
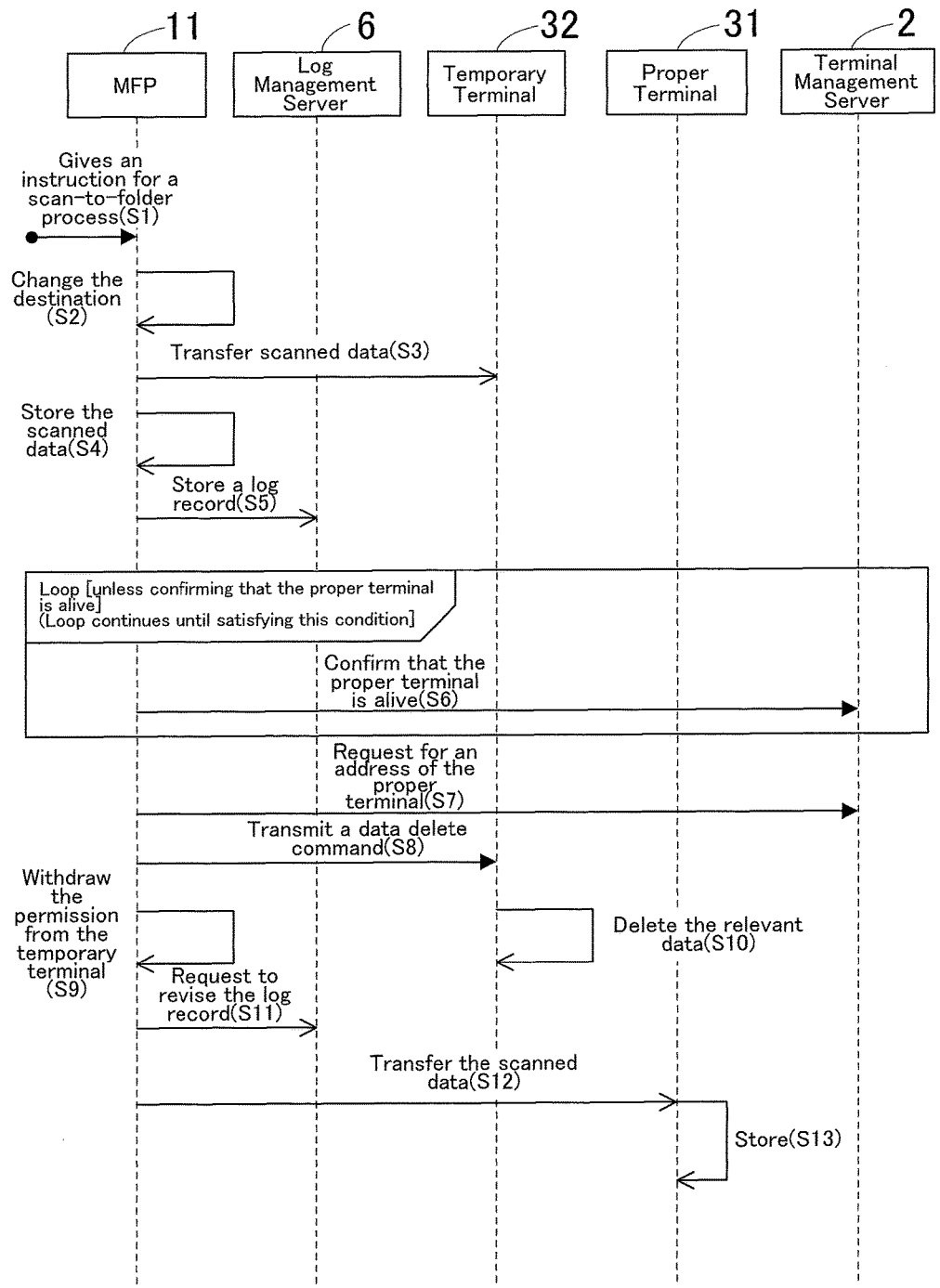
FIG. 9 is a sequence diagram illustrating the operations of the image processing apparatus in FIGS. 6 and 7 and the other apparatuses.

FIG. 9 is a sequence diagram illustrating the operations of the image processing apparatus in FIGS. 6 and 7 and the other apparatuses. The sequence in FIG. 9 and the other sequences to be mentioned below are executed by the CPU 101 of the MFP 11 in accordance with an operation program stored on a recording medium such as the ROM 102.

While the temporary terminal 32 has a temporary use permission, the user gives an instruction for a scan-to-folder process (S1). The MFP 11 changes the destination to the temporary terminal 32 if it is the proper terminal 31 (S2). If it is the temporary terminal 32 already, the MFP 11 does not change the destination.

After scanning a document, the MFP 11 transfers scanned data to the temporary terminal 32 (S3) and stores it on the fixed storage device 110 (S4). Furthermore, the MFP 11 creates a log record and stores it to the log management server 6 (S5).

Subsequently, the MFP 11 judges whether or not the proper terminal 31 is alive, in other words, whether or not the MFP 11 regains communication with the proper terminal 31 and detects the proper terminal 31 online through the intermediary of the terminal management server 2 (S6). The MFP 11 repeats this process until confirming that the proper terminal 31 is alive. When the MFP 11 detects the proper terminal 31 online on the corporate network 4, the MFP 11 then requests the terminal management server 2 for an address of the proper terminal 31 that is associated with the temporary terminal 32 (S7). The MFP 11 does not request for an address of the proper terminal 31 if it already has the same.

Receiving an address of the proper terminal 31 from the terminal management server 2, the MFP 11 transmits a data delete command to the temporary terminal 32 (S8). The MFP 11 then withdraws the permission from the temporary terminal 32, in other words, determines to reject a request for a process from the temporary terminal 32 (S9). In accordance with the data delete command from the MFP 11, the temporary terminal 32 activates the management application to delete the scanned data (S10). The temporary terminal 32 may or may not also delete this management application as well.

Subsequently, the MFP 11 requests the log management server 6 to rewrite the destination in the log record, from the temporary terminal 32 to the proper terminal 31 (S11) and transfers the scanned data to the proper terminal 31 from the fixed storage device 110 (S12). Receiving this scanned data, the proper terminal 31 stores it on a recording medium such as the fixed storage device 310 (S13).

As described above, in this embodiment, the MFP 11 stores in itself scanned data that is identical with that transferred to the temporary terminal 32. When the proper terminal 31 is detected as being online, the MFP 11 then transfers to the proper terminal 31 the scanned data that remains in the MFP 11. This means, the proper terminal 31 is allowed to keep in itself the scanned data that the proper terminal 31 should have normally kept in itself if the proper terminal 31 were used, also after the temporary terminal 32 is used temporarily in place of the proper terminal 31. This is very convenient to the user who needs immediate access to the scanned data using the proper terminal 31.

While the temporary terminal 32 has a temporary use permission, the user gives an instruction to transmit scanned data to the proper terminal 31. The MFP 11 then changes the sender from the proper terminal 31 to the temporary terminal 32. Thus the user can receive the scanned data using the temporary terminal 32 without trouble.

After that, when the proper terminal 31 is detected as being online, the MFP 11 withdraws the permission from the temporary terminal 32, in other words, determines to reject a request for a process from the temporary terminal 32.

Furthermore, when the proper terminal 31 is detected as being online, the log management server 6 rewrites the destination in the log record, from the temporary terminal 32 to the proper terminal 31. So, the user can keep a complete log record in the proper terminal 31 also after using the temporary terminal 32 in place of the proper terminal 31, making management less complicated.

Still furthermore, when the proper terminal 31 is detected as being online, the MFP 11 transmits a data delete command to the temporary terminal 32. In accordance with this command, the temporary terminal 32 activates a management application for data deletion to delete the scanned data that remains in the temporary terminal 32 after being received from the MFP 11. This can prevent a security compromise due to an unauthorized access to the scanned data that remains in the temporary terminal 32 after being transferred from the MFP 11.

Hereinafter, other examples of the operation performed by the MFP 11 in the image processing system of FIG. 1 will be described with reference to FIGS. 10 and 11. In these examples, the MFP 11 stores a log record not only on the temporary terminal 32 but also on the proper terminal 31 after printing as requested from the temporary terminal 32.

Figure 10:
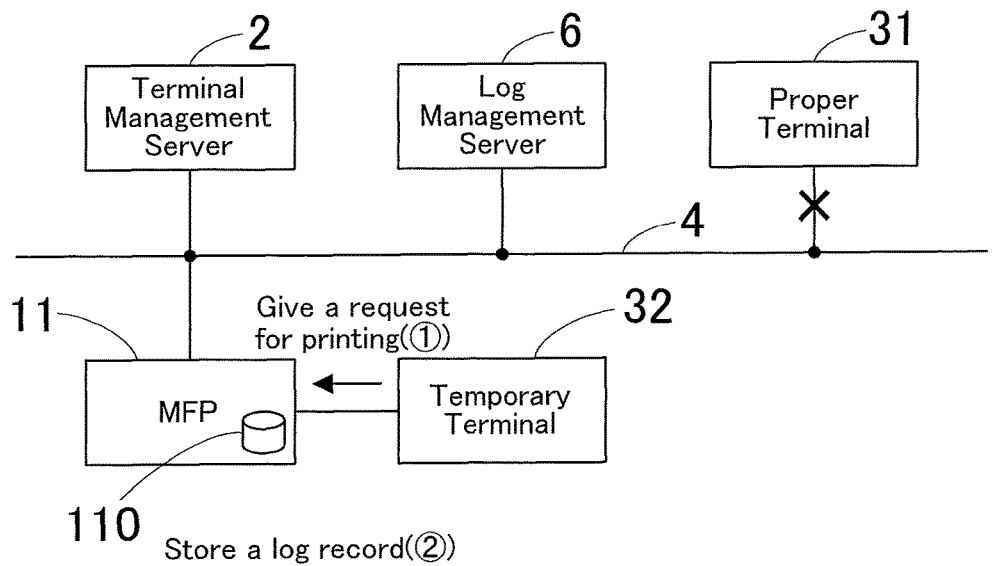
FIG. 10 is an explanatory view illustrating another example of the operation performed by the image processing apparatus in the image processing system of FIG. 1.

The user specifies a target document for printing, configures print settings about paper, color mode, both/single-sided, and other preferences, and gives a request for printing to the MFP 11 from the temporary terminal 32 having a temporary use permission (refer to the circled number 1 in FIG. 10). The MFP 11 executes printing as requested, creates a print log record, and stores it on the fixed storage device 110 (refer to the circled number 2 in FIG. 10). The MFP 11 further transfers and stores the print log record to the print management server 6.

FIG. 12 illustrates one example of a table of print log information. In this example, the table of print log information is essentially composed of the following columns: process, document title, MFP, sender, print settings, date and time, and result. The "MFP" column contains information of the MFP 11 that executed printing. The "sender" column contains identification information of the temporary terminal 32 from which a request for printing was given.

After printing, the MFP 11 regains communication with the proper terminal 31 and detects the proper terminal 31 as being online through the intermediary of the terminal management server 2. When the MFP 11 regains communication with the proper terminal 31 and detects the proper terminal 31 as being online, the MFP 11 then transmits a data delete command to the temporary terminal 32 (refer to the circled number 3 in FIG. 11) and withdraws the permission from the temporary terminal 32 (refer to the circled number 4 in FIG. 11). In accordance with the data delete command from the MFP 11, the temporary terminal 32 activates the management application installed thereon and deletes the print log record that remains in the temporary terminal 32 after execution of printing (refer to the circled number 5 in FIG. 11).

Subsequently, the MFP 11 requests the log management server 6 to rewrite the sender in the log record, from the temporary terminal 32 to the proper terminal 31 that is associated with the temporary terminal 32 (refer to the circled number 6 in FIG. 11). The MFP 11 obtains information indicating this association from the terminal management server 2. As requested, the log management server 6 rewrites the identification information in the "sender" column in the log record, from that of the temporary terminal 32 to that of the proper terminal 31.

Meanwhile, the MFP 11 rewrites the identification information in the "sender" column in the print log record stored on the fixed storage device 110, from that of the temporary terminal 32 to that of the proper terminal 31, and fits the revised log record to a recordable format on the proper terminal 31. The MFP 11 then transfers the print log record to the proper terminal 31 (refer to the circled number 7 in FIG. 11).

Receiving this print log record, the proper terminal 31 registers it on a recording medium such as the fixed storage device 310.

Figure 11:
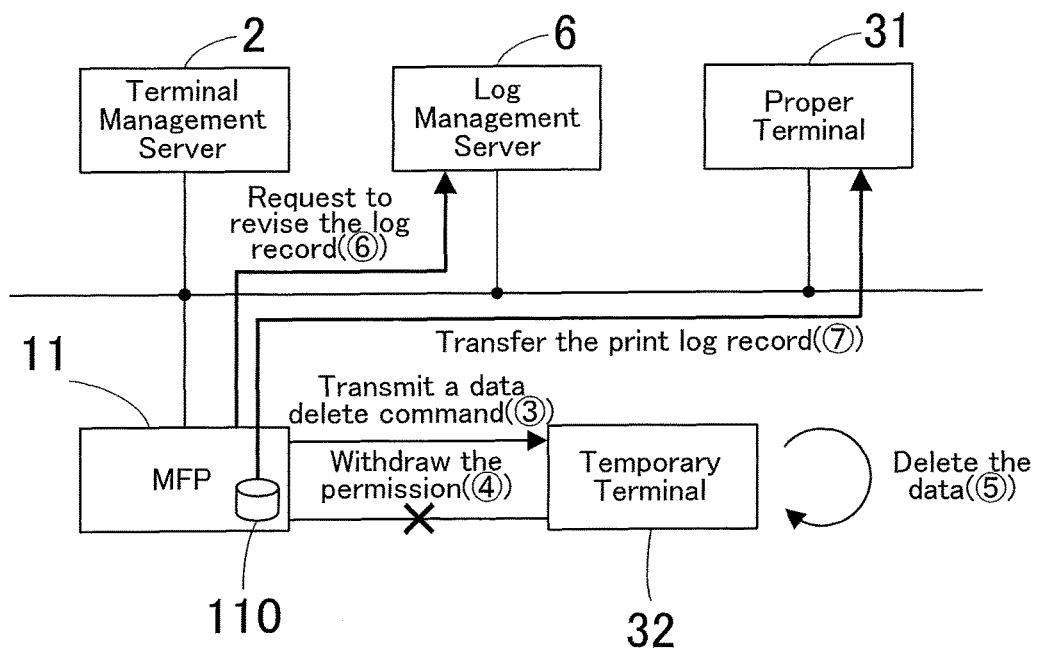
FIG. 11 is an explanatory view illustrating yet another example of the operation performed by the image processing apparatus in the image processing system of FIG. 1.
Figure 13:
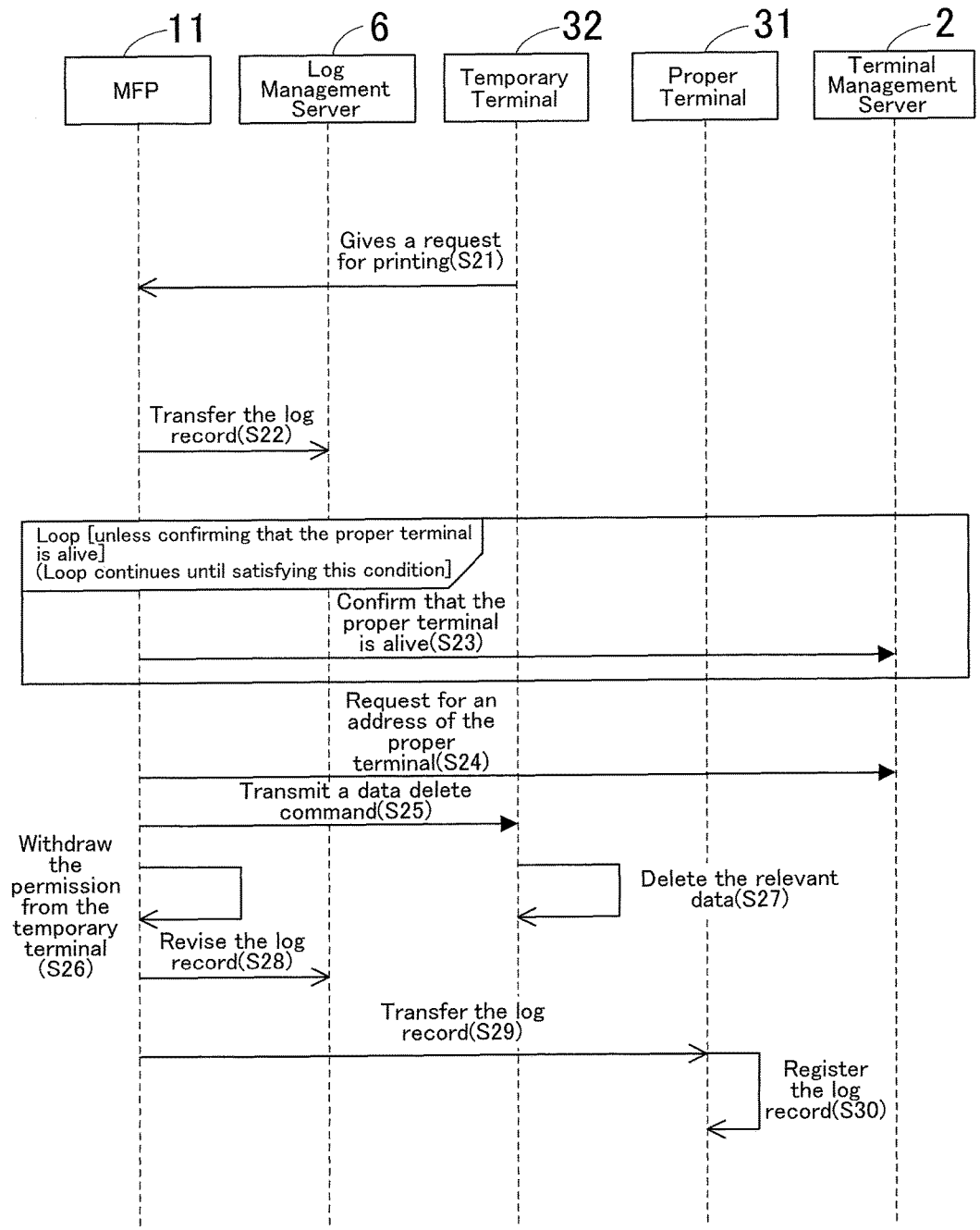
FIG. 13 is a sequence diagram illustrating the operations of the image processing apparatus in FIGS. 10 and 11 and the other apparatuses.

FIG. 13 is a sequence diagram illustrating the operations of the MFP 11 in FIGS. 10 and 11 and the other apparatuses.

The user gives a request for printing to the MFP 11 from the temporary terminal 32 having a temporary use permission (S21). The MFP 11 executes printing as requested, creates a print log record, and stores it in the MFP 11 itself. The MFP 11 further transfers the print log record to the log management server 6 (S22).

Subsequently, the MFP 11 judges whether or not the proper terminal 31 is alive, in other words, whether or not the MFP 11 regains communication with the proper terminal 31 and detects the proper terminal 31 as being online through the intermediary of the terminal management server 2 (S23). The MFP 11 repeats this process until confirming that the proper terminal 31 is alive. When the MFP 11 regains communication with the proper terminal 31 and detects the proper terminal 31 as being online, the MFP 11 then requests the terminal management server 2 for an address of the proper terminal 31 that is associated with the temporary terminal 32 (S24). The MFP 11 does not request for an address of the proper terminal 31 if it already has the same.

Receiving an address of the proper terminal 31 from the terminal management server 2, the MFP 11 transmits a data delete command to the temporary terminal 32 (S25). The MFP 11 then withdraws the permission from the temporary terminal 32, in other words, determines to reject a request for a process from the temporary terminal 32 (S26). In accordance with the data delete command from the MFP 11, the temporary terminal 32 activates the management application to delete the print log record that remains in the temporary terminal 32 after execution of printing (S27).

Subsequently, the MFP 11 requests the log management server 6 to rewrite the sender in the print log record, from the temporary terminal 32 to the proper terminal 31 (S28). Meanwhile, the MFP 11 rewrites the sender in the log record stored on the fixed storage device 110, from the temporary terminal 32 to the proper terminal 31, and fits the revised log record to a recordable format on the proper terminal 31. The MFP 11 then transfers the print log record to the proper terminal 31 (S29). Receiving this print log record, the proper terminal 31 registers it on a recording medium such as the fixed storage device 310 (S30).

If necessary, the MFP 11 may further have an exclusive application for fitting a print log record to a recordable format on the proper terminal 31.

As described above, in this embodiment, the MFP 11 executes printing as requested from the temporary terminal 32, creates a print log record, and stores it in the MFP 11 itself. When the proper terminal 31 is detected as being online, the MFP 11 then rewrites the sender in the print log record, from the temporary terminal 32 to proper terminal 31, fits the revised log record to a recordable format on the proper terminal 31, and transfers it to the proper terminal 31. This means, the proper terminal 31 is allowed to keep in itself the print log record that the proper terminal 31 should have normally kept in itself if the proper terminal 31 were used, also after the temporary terminal 32 is used temporarily in place of the proper terminal 31. So, the user can keep in the proper terminal 31 a complete log record about a process whichever between the MFP 11 and the proper terminal 31 or between the MFP 11 and the temporary terminal 32.

Hereinafter, yet another example of the operation performed by the MFP 11 in the image processing system of FIG. 1 will be described with reference to FIG. 14. In this example of FIG. 14, the MFP 11 starts this operation when it receives a notice of finish for breaking off the temporary use permission from the temporary terminal 32.

Figure 14:
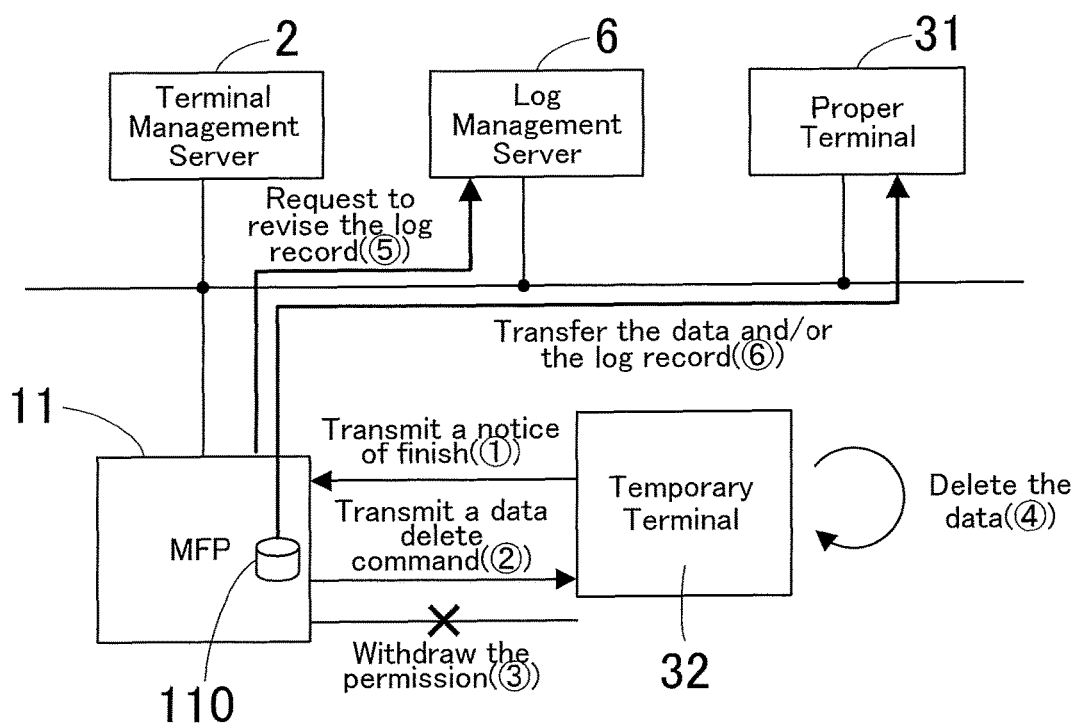
FIG. 14 is an explanatory view illustrating still yet another example of the operation performed by the image processing apparatus in the image processing system of FIG. 1.

The temporary terminal 32 having a temporary use permission transmits a notice of finish for breaking off the temporary use permission to the MFP 11 (refer to the circled number 1 in FIG. 14). The MFP 11 transmits a data delete command to the temporary terminal 32 (refer to the circled number 2 in FIG. 14) and withdraws the permission from the temporary terminal 32 (refer to the circled number 3 in FIG. 14). In accordance with the data delete command from the MFP 11, the temporary terminal 32 activates the management application installed thereon and deletes the data about a process between the MFP 11 and the temporary terminal 32, which is the scanned data and the log record, for example (refer to the circled number 4 in FIG. 14).

Subsequently, the MFP 11 requests the log management server 6 to rewrite the sender in the log record, from the temporary terminal 32 to the proper terminal 31 that is associated with the temporary terminal 32 (refer to the circled number 5 in FIG. 14). The MFP 11 obtains information indicating this association from the terminal management server 2. As requested, the log management server 6 rewrites the sender in the log record, from the temporary terminal 32 to the proper terminal 31.

After requesting to revise the log record, the MFP 11 regains communication with the proper terminal 31 and detects the proper terminal 31 as being online through the intermediary of the terminal management server 2. When the MFP 11 detects the proper terminal 31 as being online on the corporate network 4, the MFP 11 then transfers the scanned data and/or the log record that the proper terminal 31 should have normally kept in itself, to the proper terminal 31 from the fixed storage device 110 (refer to the circled number 6 in FIG. 14). Meanwhile, the MFP 11 rewrites the sender in the log record, from the temporary terminal 32 to the proper terminal 31, and fits the revised log record to a recordable format on the proper terminal 31. The MFP 11 then transfers the print log record to the proper terminal 31.

Receiving the scanned data and the log record, the proper terminal 31 stores the scanned data and registers the log record on a recording medium such as the fixed storage device 310.

Figure 15:
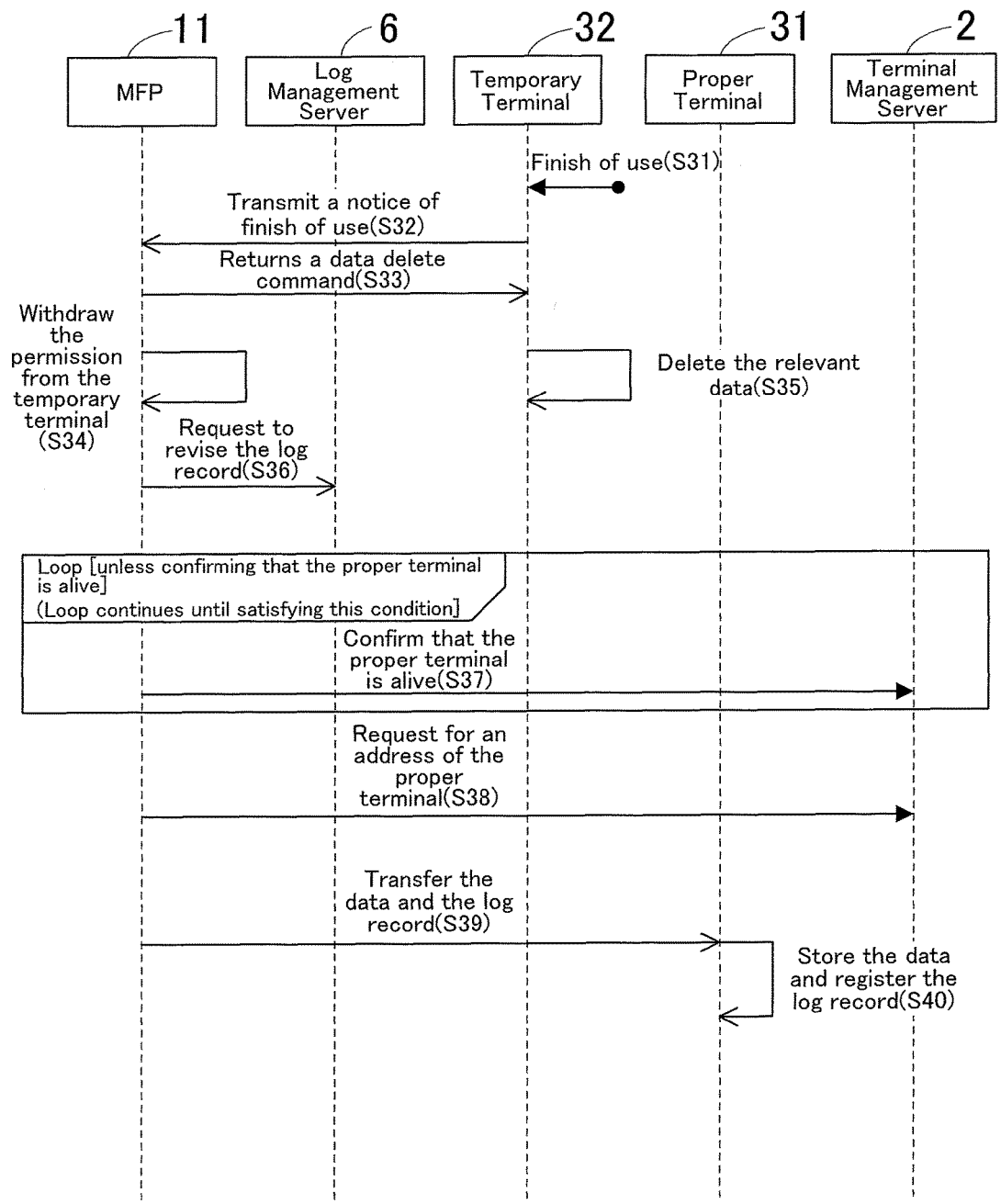
FIG. 15 is a sequence diagram illustrating the operations of the image processing apparatus in FIG. 14 and the other apparatuses.

FIG. 15 is a sequence diagram illustrating the operation of the MFP 11 in FIG. 14 and the other apparatuses.

The user finishes use of the temporary terminal 32 having a temporary use permission (S31), and the temporary terminal 32 transmits a notice of finish for breaking off the temporary use permission to the MFP 11 (S32). The MFP 11 returns a data delete command to the temporary terminal 32 (S33) and withdraws the permission from the temporary terminal 32 so as to reject a request for a process from the temporary terminal 32 (S34). In accordance with the data delete command from the MFP 11, the temporary terminal 32 activates the management application to delete the data about a process between the MFP 11 and the temporary terminal 32 (S35).

Subsequently, the MFP 11 requests the log management server 6 to rewrite the sender in the log record, from the temporary terminal 32 to the proper terminal 31 that is associated with the temporary terminal 32 (S36). As requested, the log management server 6 rewrites the sender in the log record from the temporary terminal 32 to the proper terminal 31.

After that, the MFP 11 judges whether or not the proper terminal 31 is alive, in other words, whether or not the MFP 11 regains communication with the proper terminal 31 and detects the proper terminal 31 as being online through the intermediary of the terminal management server 2 (S37). The MFP 11 repeats this process until confirming that the proper terminal 31 is alive. When the MFP 11 regains communication with the proper terminal 31 and detects the proper terminal 31 as being online, the MFP 11 then requests the terminal management server 2 for an address of the proper terminal 31 that is associated with the temporary terminal 32 (S38). The MFP 11 does not request for an address of the proper terminal 31 if it already has the same.

Receiving an address of the proper terminal 31 from the terminal management server 2, the MFP 11 transfers the data that the proper terminal 31 should have normally kept in itself, which is the scanned data and the log record, for example, to the proper terminal 31 (S39). Meanwhile, the MFP 11 rewrites the sender in the log record, from the temporary terminal 32 to the proper terminal 31, fits the revised log record to a recordable format on the proper terminal 31, and transfers it to the proper terminal 31. Receiving the scanned data and the log record, the proper terminal 31 stores the scanned data and registers the log record on a recording medium such as the fixed storage device 310 (S40).

The MFP 11 may have an exclusive application for fitting a log record to a recordable format on the proper terminal 31 if necessary.

As described above, in this embodiment, upon receiving a notice of finish of temporary use (a notice for breaking off the temporary use permission) from the temporary terminal 32, the MFP 11 withdraws the permission from the temporary terminal 32, in other words, determines to refuse a request for a process from the temporary terminal 32. This can prevent a security compromise due to concurrent access by one and the same user from the proper terminal 31 and the temporary terminal 32.

After that, when the proper terminal 31 is detected as being online, the MFP 11 transfers the data that the proper terminal 31 should have normally kept in itself, to the proper terminal 31. This means, the proper terminal 31 is allowed to keep in itself the data that the proper terminal 31 should have normally kept in itself if the proper terminal 31 were used, also after the temporary terminal 32 is used temporarily in place of the proper terminal 31. This is convenient to the user who needs immediate access to the data using the proper terminal 31.

The present invention, one embodiment of which is described above in details, should not necessarily be limited to this embodiment.

For example, the log management server 6 herein manages log information. Alternatively, the MFP 11 may manage log information in the MFP 11 itself. For another example, it is herein the terminal management server 2 that stores information indicating the association between the proper terminal 31 and the temporary terminal 32, by storing the management information of FIG. 5. Alternatively, it may be the MFP 11 that stores information indicating the association between the proper terminal 31 and the temporary terminal 32, by storing the management information.

For yet another example, when it rewrites information in its log record, from the temporary terminal 32 to the proper terminal 31, the MFP 11 may further add information about the temporary terminal 32 in the same log record; when it requests the log management server 6 to rewrite information in its log record, from the temporary terminal 32 to the proper terminal 31, the MFP 11 may further request the log management server 6 to add information about the temporary terminal 32 in the same log record.

For still yet another example, the MFP 11 may be further configured to determine a scope and validity period of the temporary use permission given to the temporary terminal 32, store this information in the MFP 11 itself, and displays its log record along with the determined scope and validity period at a later date when necessary.

For still yet another example, if the MFP 11 has a problem in transferring the scanned data and/or the log record to the proper terminal 31 after detecting the proper terminal 31 as being online through the intermediary of the terminal management server 2, the MFP 11 may transmit, instead, a data path to the proper terminal 31 by e-mail then transfer the data when the problem is solved. In this case, as long as the network of the MFP 11 accepts accesses from outside, the user can access the data stored on the MFP 11 from the proper terminal 31 using the data path received by e-mail.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
a data storage, a transmitter and a hardware processor, the hardware processor being configured to:
obtain association information indicating an association between a first portable terminal apparatus and a second portable terminal apparatus from an association information storage that stores the association information, the first portable terminal apparatus having a proper use permission to use a function of the image processing apparatus from the first portable terminal apparatus, the second portable terminal apparatus having a temporary use permission to use the function of the image processing apparatus from the second portable terminal apparatus in place of the first portable terminal apparatus, the association information storage being installed inside or outside the image processing apparatus;
store, in the data storage, data caused by a process between the image processing apparatus and the second portable terminal apparatus, the data to be transferred to and stored in the first portable terminal apparatus; and
detect the first portable terminal apparatus as being online, and
the transmitter being configured to transmit the data to the first portable terminal apparatus when the hardware processor detects the first portable terminal apparatus as being online, the data being stored on the data storage, the first portable terminal apparatus being associated with the second portable terminal apparatus according to the association information obtained by the hardware processor.

2. The image processing apparatus according to claim 1, wherein:
the data stored on the data storage is identical with data transferred to the second portable terminal apparatus from the image processing apparatus; and
the transmitter is configured to transmit the data to the first portable terminal apparatus.

3. The image processing apparatus according to claim 1, wherein:
the data stored on the data storage is a log record about the process between the image processing apparatus and the second portable terminal apparatus; and
the hardware processor is configured to rewrite information in the log record, from the second portable terminal apparatus to the first portable terminal apparatus, and the transmitter is configured to transmit the log record to the first portable terminal apparatus.

4. The image processing apparatus according to claim 1, wherein the hardware processor is further configured to cause the data to be transmitted to the second portable terminal apparatus if an instruction to transmit the data to the first portable terminal apparatus is given while the second portable terminal apparatus has the temporary use permission.

5. The image processing apparatus according to claim 1, wherein the hardware processor is further configured to reject a request for a process from the second portable terminal apparatus when the hardware processor detects the first portable terminal apparatus as being online or when the temporary use permission is withdrawn from the second portable terminal apparatus.

6. The image processing apparatus according to claim 1, further comprising a log information storage that stores a log record about a process between the image processing apparatus and the first portable terminal apparatus or between the image processing apparatus and the second portable terminal apparatus, the log information storage being installed inside or outside the image processing apparatus; and wherein the hardware processor is configured to rewrite information in the log record, from the second portable terminal apparatus to the first portable terminal apparatus, when the hardware processor detects the first portable terminal apparatus as being online or when the temporary use permission is withdrawn from the second portable terminal apparatus.

7. The image processing apparatus according to claim 1, wherein the second portable terminal apparatus has a management application installed thereon, the management application being configured to delete the data about the process between the image processing apparatus and the second portable terminal apparatus, the hardware processor of the image processing apparatus being further configured to output a data delete command to the second portable terminal apparatus when the hardware processor detects the first portable terminal apparatus as being online or when the temporary use permission is withdrawn from the second portable terminal apparatus, the data delete command for activating the management application to delete the data.

8. An image processing system comprising:
the image processing apparatus according to claim 1;
a first portable terminal apparatus having a proper use permission to use a function of the image processing apparatus from the first portable terminal apparatus; and
a second portable terminal apparatus having a temporary use permission to use the function of the image processing apparatus from the second portable terminal apparatus in place of the first second portable terminal apparatus.

9. The image processing apparatus according to claim 1, wherein the data should have normally been stored in the first portable terminal apparatus if the data were caused by a process between the image processing apparatus and the first portable terminal apparatus.

10. A non-transitory computer-readable recording medium storing a program for making a computer of an image processing apparatus execute:
obtaining association information indicating an association between a first portable terminal apparatus and a second portable terminal apparatus from an association information storage that stores the association information, the first portable terminal apparatus having a proper use permission to use a function of the image processing apparatus from the first portable terminal apparatus, the second portable terminal apparatus having a temporary use permission to use the function of the image processing apparatus from the second portable terminal apparatus in place of the first portable terminal apparatus, the association information storage being installed inside or outside the image processing apparatus;
storing on a data storage data caused by a process between the image processing apparatus and the second portable terminal apparatus, the data to be transferred to and stored in the first portable terminal apparatus;
detecting the first portable terminal apparatus as being online; and
providing the data to the first portable terminal apparatus when the first portable terminal apparatus is detected as being online, the data being stored on the data storage, the first portable terminal apparatus being associated with the second portable terminal apparatus according to the association information obtained from the association information storage.

11. The non-transitory computer-readable recording medium storing the program according to claim 10, wherein:
the data stored on the data storage is identical with data transferred to the second portable terminal apparatus from the image processing apparatus; and
the data is provided to the first portable terminal apparatus.

12. The non-transitory computer-readable recording medium storing the program according to claim 10, wherein:
the data stored on the data storage is a log record about the process between the image processing apparatus and the second portable terminal apparatus; and
information in the log record is rewritten from the second portable terminal apparatus to the first portable terminal apparatus, and the log record is provided to the first portable terminal apparatus.

13. The non-transitory computer-readable recording medium storing the program according to claim 10, the program further comprising making the data be provided to the second portable terminal apparatus if an instruction to transmit the data to the first portable terminal apparatus is given while the second portable terminal apparatus has the temporary use permission.

14. The non-transitory computer-readable recording medium storing the program according to claim 10, the program further comprising rejecting a request for a process from the second portable terminal apparatus when the first portable terminal apparatus is detected as being online or when the temporary use permission is withdrawn from the second portable terminal apparatus.

15. The non-transitory computer-readable recording medium storing the program according to claim 10, the program further comprising:
storing on a log information storage a log record about a process between the image processing apparatus and the first portable terminal apparatus or between the image processing apparatus and the second portable terminal apparatus, the log information storage being installed inside or outside the image processing apparatus; and
rewriting information in the log record, from the second portable terminal apparatus to the first portable terminal apparatus, when the first portable terminal apparatus is detected as being online or when the temporary use permission is withdrawn from the second portable terminal apparatus.

16. The non-transitory computer-readable recording medium storing the program according to claim 10, wherein the second portable terminal apparatus has a management application installed thereon, the management application being capable of deleting the data about the process between the image processing apparatus and the second portable terminal apparatus, the program further comprising outputting a data delete command to the second portable terminal apparatus when the first portable terminal apparatus is detected as being online or when the temporary use permission is withdrawn from the second portable terminal apparatus, the data delete command for activating the management application to delete the data.

17. The non-transitory computer-readable recording medium storing the program according to claim 10, wherein the data should have normally been stored in the first portable terminal apparatus if the data were caused by a process between the image processing apparatus and the first portable terminal apparatus.

\* \* \* \* \*